(12) United States Patent
Lin et al.

(10) Patent No.: US 10,672,164 B2
(45) Date of Patent: Jun. 2, 2020

(54) PREDICTING PATCH DISPLACEMENT MAPS USING A NEURAL NETWORK

(71) Applicant: Adobe Inc., San Jose, CA (US)

(72) Inventors: Zhe Lin, Fremont, CA (US); Xin Lu, Mountain View, CA (US); Xiaohui Shen, San Jose, CA (US); Jimei Yang, Mountain View, CA (US); Jiahui Yu, Champaign, IL (US)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 15/785,386

(22) Filed: Oct. 16, 2017

(65) Prior Publication Data

US 2019/0114818 A1   Apr. 18, 2019

(51) Int. Cl.
*G06T 11/60* (2006.01)
*G06K 9/62* (2006.01)
(Continued)

(52) U.S. Cl.
CPC ............ *G06T 11/60* (2013.01); *G06K 9/4628* (2013.01); *G06K 9/621* (2013.01); *G06K 9/6267* (2013.01); *G06K 9/6269* (2013.01); *G06K 9/66* (2013.01); *G06N 3/0454* (2013.01); *G06N 3/084* (2013.01); *G06T 5/005* (2013.01); *G06T 5/30* (2013.01); *G06K 2009/6213* (2013.01);
(Continued)

(58) Field of Classification Search
None
See application file for complete search history.

(56) References Cited

U.S. PATENT DOCUMENTS 6,160,923 A   12/2000   Lawton et al.
8,233,739 B1   7/2012   Cho et al.
(Continued)

FOREIGN PATENT DOCUMENTS

GB   2255699   11/1992

OTHER PUBLICATIONS

"Non-Final Office Action", U.S. Appl. No. 15/679,602, dated Sep. 30, 2019, 9 pages.
(Continued)

*Primary Examiner* — Kevin Ky
(74) *Attorney, Agent, or Firm* — SBMC

(57) ABSTRACT

Predicting patch displacement maps using a neural network is described. Initially, a digital image on which an image editing operation is to be performed is provided as input to a patch matcher having an offset prediction neural network. From this image and based on the image editing operation for which this network is trained, the offset prediction neural network generates an offset prediction formed as a displacement map, which has offset vectors that represent a displacement of pixels of the digital image to different locations for performing the image editing operation. Pixel values of the digital image are copied to the image pixels affected by the operation by: determining the vectors pixels that correspond to the image pixels affected by the image editing operation and mapping the pixel values of the image pixels represented by the determined offset vectors to the affected pixels. According to this mapping, the pixel values of the affected pixels are set, effective to perform the image editing operation.

20 Claims, 8 Drawing Sheets
(5 of 8 Drawing Sheet(s) Filed in Color)

(51) Int. Cl.
*G06T 5/00* (2006.01)
*G06T 5/30* (2006.01)
*G06K 9/66* (2006.01)
*G06N 3/04* (2006.01)
*G06K 9/46* (2006.01)
*G06N 3/08* (2006.01)

(52) U.S. Cl.
CPC .. *G06N 3/0472* (2013.01); *G06T 2207/10016* (2013.01); *G06T 2207/10024* (2013.01); *G06T 2207/20012* (2013.01); *G06T 2207/20076* (2013.01); *G06T 2207/20081* (2013.01); *G06T 2207/20084* (2013.01)

(56) References Cited

U.S. PATENT DOCUMENTS

| | | | |
|---|---|---|---|
| 8,249,365 | B1 | 8/2012 | Winnemoeller et al. |
| 8,340,463 | B1 | 12/2012 | Cho et al. |
| 8,670,630 | B1 | 3/2014 | Kwatra |
| 9,208,548 | B1 | 12/2015 | Noble et al. |
| 9,552,626 | B1 | 1/2017 | Filra |
| 9,697,234 | B1 | 7/2017 | Dhua et al. |
| 9,922,425 | B2 | 3/2018 | Partis et al. |
| 10,134,108 | B2 | 11/2018 | Amirghodsi et al. |
| 10,198,839 | B2 | 2/2019 | Rymkowski et al. |
| 10,282,877 | B2 | 5/2019 | Bedi et al. |
| 10,614,557 | B2 | 4/2020 | Lin et al. |
| 2006/0104542 | A1 | 5/2006 | Blake et al. |
| 2012/0141045 | A1 | 6/2012 | Bae et al. |
| 2013/0051685 | A1 | 2/2013 | Shechtman et al. |
| 2013/0266208 | A1 | 10/2013 | Lim et al. |
| 2014/0201126 | A1 | 7/2014 | Zadeh et al. |
| 2014/0254882 | A1 | 9/2014 | Jin |
| 2015/0036945 | A1 | 2/2015 | Zullani |
| 2016/0027159 | A1 | 1/2016 | Amirghodsi et al. |
| 2017/0140514 | A1 | 5/2017 | Amirghodsi et al. |
| 2017/0178325 | A1 | 6/2017 | Ye et al. |
| 2017/0278289 | A1 | 9/2017 | Marino et al. |
| 2017/0372193 | A1* | 12/2017 | Mailhe ................. G06N 3/0472 |
| 2018/0082715 | A1 | 3/2018 | Rymkowski et al. |
| 2018/0096454 | A1 | 4/2018 | Amirghodsi et al. |
| 2018/0107896 | A1 | 4/2018 | Sagong |
| 2018/0121754 | A1 | 5/2018 | Carr et al. |
| 2018/0150940 | A1 | 5/2018 | Reinhard et al. |
| 2018/0165798 | A1 | 6/2018 | Lin et al. |
| 2018/0174276 | A1 | 6/2018 | Michel et al. |
| 2018/0211380 | A1 | 7/2018 | Tandon et al. |
| 2018/0322662 | A1 | 11/2018 | Hellier et al. |
| 2018/0350030 | A1 | 12/2018 | Simons et al. |
| 2019/0043242 | A1 | 2/2019 | Risser |
| 2019/0057527 | A1 | 2/2019 | Jin et al. |
| 2019/0066268 | A1 | 2/2019 | Song et al. |
| 2019/0066733 | A1* | 2/2019 | Somanath ................ G06T 7/246 |
| 2019/0073792 | A1* | 3/2019 | Fletcher ................... G06T 7/74 |
| 2019/0095730 | A1 | 3/2019 | Fu et al. |
| 2019/0114511 | A1 | 4/2019 | Gao et al. |
| 2019/0114748 | A1 | 4/2019 | Lin et al. |
| 2019/0347772 | A1 | 11/2019 | Zhang et al. |
| 2019/0355102 | A1 | 11/2019 | Lin et al. |

OTHER PUBLICATIONS

"Pre-Interview First Office Action", U.S. Appl. No. 15/785,359, dated Sep. 18, 2019, 4 pages.
"Restriction Requirement", U.S. Appl. No. 15/785,359, dated Jul. 5, 2019, 6 pages.
"First Action Interview Office Action", U.S. Appl. No. 15/679,602, dated Sep. 28, 2018, 5 pages.
Achanta,"SLIC Superpixels Compared to State-of-the-Art Superpixel Methods", IEEE Transactions on Pattern Analysis and Machine Intelligence, vol. 34, No. 11, Nov. 2012, pp. 2274-2281.
Ballester,"Filling-In by Joint Interpolation of Vector Fields and Gray Levels", IEEE transactions on image processing, Apr. 2, 2001, 30 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Bertalmio,"Image Inpainting", SIGGRAPH '00: Proceedings of the 2ih annual conference on computer graphics and interactive techniques, ACM Press/Addison-Wesley Publishing Co., New York, NY, USA, 2000, 8 pages.
Chen,"Fast Patch-based Style Transfer of Arbitrary Style", Dec. 13, 2016, 10 pages.
Cimpoi,"Describing Textures in the Wild", In Proceedings of the IEEE Conference on Computer Vision and Pattern Recognition, Nov. 15, 2013, 13 pages.
Dai,"Deformable Convolutional Networks", Jun. 5, 2017, 12 pages.
Darabi,"Image Melding: Combining Inconsistent Images using Patch-based Synthesis", ACM Transactions on Graphics 31, 4, 82, Aug. 2012, 10 pages.
Efros,"Image Quilting for Texture Synthesis and Transfer", SIGGRAPH 2001, Computer Graphics Proceedings, ACM Press/ACM SIGGRAPH, E. Fiume Ed.,, 2001, 6 pages.
Efros,"Texture Synthesis by Non-parametric Sampling", In: IEEE International Conference on Computer Vision. (1999), Sep. 1999, 6 pages.
Farbman,"Convolution Pyramids", ACM Trans. Graph. 30, 6, Nov. 2012, 9 pages.
Gatys,"Image Style Transfer Using Convolutional Neural Networks", In Proc. CVPR, 2016., Jun. 2016, pp. 2414-2423.
Gatys,"Preserving Color in Neural Artistic Style Transfer", https://arxiv.org/abs/1606.05897, Jun. 19, 2016, 8 pages.
Glasner,"Super-Resolution from a Single Image", Super-Resolution form a Single Image, Oct. 20, 2009, 8 pages.
Goodfellow,"Generative Adversarial Nets", Jun. 10, 2014, 9 pages.
Gulrajani,"Improved Training of Wasserstein GANs", Dec. 25, 2017, 20 pages.
Hays,"Scene Completion Using Millions of Photographs", ACM SIGGRAPH, vol. 26, 4:1-4, 2007, 7 pages.
He,"Deep Residual Learning for Image Recognition", Dec. 10, 2015, 12 pages.
He,"Statistics of Patch Offsets for Image Completion", ECCV 2012, 2012, 14 pages.
Huang,"Image Completion using Planar Structure Guidance", Proceedings of ACM SIGGRAPH 2014, Jul. 2014, 10 pages.
Jaderberg,"Spatial Transformer Networks", Feb. 4, 2016, 14 pages.
Jeon,"Active Convolution: Learning the Shape of Convolution for Image Classification", May 27, 2017, 9 pages.
Johnson,"Perceptual Losses for Real-Time Style Transfer and Super-Resolution.", Mar. 27, 2016, 18 pages.
Karras,"Progressive Growing of GANs for Improved Quality, Stability, and Variation", Feb. 26, 2018, 26 pages.
Klose,"Sampling Based Scene-Space Video Processing", ACM Transactions on Graphics (TOG)—Proceedings of ACM SIGGRAPH 2015, Aug. 2015, 11 pages.
Kohler,"Mask-specific Inpainting with Deep Neural Networks", Oct. 15, 2014, 12 pages.
Kohli,"Robust Higher Order Potentials for Enforcing Label Consistency", Retrieved from <<http://research. microsoft.com/en-us/um/people/pkohli/papers/klt_ cvpr08. pdf>> on Jun. 19, 2009, Jan. 2009, 8 pages.
Kwatra,"Graphcut Textures: Image and Video Synthesis Using Graph Cuts", ACM Trans. Graph. 22 (2003), 3, 2003, 10 pages.
Lee,"Deeply-Supervised Nets", Sep. 25, 2014, 10 pages.
Levin,"Seamless Image Stitching in the Gradient Domain", Proceedings of the European Conference on Computer Vision, May 2004, pp. 377-389.
Li,"Combining Markov Random Fields and Convolutional Neural Networks for Image Synthesis", In Proceedings of the IEEE Conference on Computer Vision and Pattern Recognition, Jan. 18, 2016, 9 pages.
Li,"Generative Face Completion", Apr. 19, 2017, 9 pages.
Liu,"Deep Learning Face Attributes in the Wild", Jan. 24, 2015, 11 pages.
Liu,"Exemplar-based Image Inpainting using Multiscale Graph Cuts", IEEE Transactions on Image Processing—vol. 22, Issue: 5, Sep. 13, 202, 13 pages.

(56) References Cited

OTHER PUBLICATIONS

Mao,"Least Squares Generative Adversarial Networks", Apr. 5, 2017, 16 pages.
Newson,"Video Inpainting of Complex Scenes", SIAM Journal of Imaging Science 7, 4, Mar. 18, 2015, 27 pages.
Nguyen,"Synthesizing the preferred inputs for neurons in neural networks via deep generator networks", Nov. 23, 2016, 29 pages.
Park,"Transformation-Grounded Image Generation Network for Novel 3D View Synthesis", Mar. 8, 2017, 17 pages.
Perez,"Poisson Image Editing", Proc. ACM SIGGRAPH 2003, Jul. 2003, 6 pages.
Rother,""GrabCut"—Interactive Foreground Extraction using Iterated Graph Cuts", ACM SIGGRAPH 2004, Aug. 2004, 6 pages.
Russakovsky,"ImageNet Large Scale Visual Recognition Challenge", Jan. 30, 2015, 43 pages.
Salimans,"Improved Techniques for Training GANs", In Advances in Neural Information Processing Systems, Jun. 10, 2016, 10 pages.
Simakov,"Summarizing Visual Data Using Bidirectional Similarity", In Proceedings of CVPR 2008, Jun. 23, 2008, 8 pages.
Snelgrove,"High-Resolution Multi-Scale Neural Texture Synthesis", In SIGGRAPH ASIA 2017 Technical Briefs, Nov. 27, 2017, 4 pages.
Sutton,"Reinforcement Learning: An Introduction", The MIT Press Cambridge, Massachusetts, 1998, 398 pages.
Wei,"Fast Texture Synthesis Using Tree-Structured Vector Quantization", Proceedings of SIGGRAPH 2000, 2000, 10 pages.
Wilber,"BAM! The Behance Artistic Media Dataset for Recognition Beyond Photography", Computer Vision and Pattern Recognition (cs.CV), Apr. 27, 2017, 10 pages.
Xu,"Deep Convolutional Neural Network for Image Deconvolution", In Advances in Neural Information Processing Systems, Dec. 8, 2014, 9 pages.
Yang,"High-Resolution Image Inpainting using Multi-Scale Neural Patch Synthesis", Apr. 13, 2017, 9 pages.
Yeh,"Semantic Image Inpainting with Deep Generative Models", Jul. 13, 2017, 19 pages.
Yu,"Multi-Scale Context Aggregation by Dilated Convolutions", Computer Vision and Pattern Recognition, Apr. 2016, 13 pages.
Zhou,"Places: A 10 million Image Database for Scene Recognition", Jul. 4, 2017, 14 pages.
Zhou,"View Synthesis by Appearance Flow", In European Conference on Computer Vision, Feb. 11, 2017, 16 pages.
"Combined Search and Examination Report", GB Application No. 1813278.7, dated Feb. 18, 2019, 5 pages.
"Combined Search and Examination Report", GB Application No. 1813319.9, dated Feb. 15, 2019, 6 pages.
"Pre-Unterview First Office Action", U.S. Appl. No. 15/679,602, dated Jun. 20, 2018, 4 pages.
Lu,"Deep Multi-Patch Aggregation Network for Image Style, Aesthetics, and Quality Estimation", In Proceedings of the IEEE International Conference on Computer Vision, Dec. 2015, 9 pages.
"Final Office Action", Application No. 15/679,602, dated Feb. 13, 2019, 25 pages.
Michel,"Completing an Image", EP Application No. 16306754.9, filed on Dec. 21, 2016, 21 pages.
Arjovsky,"Wasserstein GAN", Mar. 9, 2017, 32 pages.
Clevert,"Fast and Accurate Deep Network Learning by Exponential Linear Units (ELUs)", ICLR 2016, Feb. 22, 2016, 14 pages.
Iizuka,"Globally and Locally Consistent Image Completion", ACM Transactions on Graphics (TOG) 36, Jul. 20, 2017, 13 pages.
Ioffe,"Batch Normalization: Accelerating Deep Network Training by Reducing Internal Covariate Shift", Mar. 2015, 11 pages.
Pathak,"Context Encoders: Feature Learning by Inpainting", CVPR 2016, Nov. 21, 2016, 12 pages.
Radford,"Unsupervised Representation Learning with Deep Convolutional Generative Adversarial Networks", ICLR 2016, Jan. 7, 2016, 16 pages.
"Corrected Notice of Allowability", U.S. Appl. No. 15/785,359, dated Jan. 16, 2020, 3 pages.
"Pre-Interview First Office Action", U.S. Appl. No. 15/980,691, dated Dec. 10, 2019, 4 pages.
"Notice of Allowance", U.S. Appl. No. 15/785,359, dated Nov. 6, 2019, 9 pages.
"Corrected Notice of Allowability", U.S. Appl. No. 15/785,359, dated Mar. 10, 2020, 3 pages.
"Notice of Allowance", U.S. Appl. No. 15/980,691, dated Apr. 6, 2020, 7 pages.
"Notice of Allowance", U.S. Appl. No. 15/679,602, dated Mar. 10, 2020, 9 pages.

\* cited by examiner

PREDICTING PATCH DISPLACEMENT MAPS USING A NEURAL NETWORK

BACKGROUND

Content creation systems continue to make advances in computing technologies to enhance digital images in various ways largely limited to professional photographers in the past. With these advances, content creation systems are able to generate professional quality digital images from digital images captured by device users with little to no experience or knowledge of rules for composing visually pleasing images, e.g., the rule of thirds. By way of example, content creation systems can analyze a digital image and, based on the analysis, select post-processing operations, such as cropping, zooming, filtering, and so on, to perform on the digital image. In some cases, these content creation systems use patch matching to carry out such image editing operations. Broadly speaking, patch matching involves copying values from a group of pixels in an image to the image's pixels that are affected by an operation. Consider an example in which patch matching is leveraged in connection with filling a hole of an image. To fill such a hole, patch matching may be leveraged to copy values of pixels that correspond to the remaining imagery to the pixels that correspond to the hole.

Conventional patch matching techniques attempt to locate a nearest patch (e.g., group of pixels) having pixel values that approximately match the pixels being edited by an image editing operation. In some scenarios, however, this mere nearest patch matching can result in edited images that are not semantically consistent. Consider an example in which a digital image of a person's face has a hole located at one of the person's eyes. Using conventional hole filling techniques that involve patch matching, this hole is filled based on patches of pixels nearby the hole, e.g., pixels corresponding to the person's brow, eye socket, cheek, nose, and so on. Merely copying values of these pixels to the hole pixels at the person's eye fails to reproduce an eye at the location though. Accordingly, conventional patch matching techniques may be unsuitable for implementing various image-editing operations.

SUMMARY

To overcome these problems, predicting patch displacement maps using a neural network is leveraged in a digital medium environment. Initially, a digital image is received relative to which an image editing operation is to be performed. This digital image is provided as input to a patch matcher formed to have a framework that includes an offset prediction neural network. From the digital image and based on the image editing operation for which the offset prediction neural network is trained, the offset prediction neural network generates an offset prediction formed as a displacement map. This displacement map is formed of offset vectors that represent a displacement of image pixels of the digital image as it is input to different locations for performing the image editing operation. The offset prediction further serves as a basis for copying pixel values of the digital image to the image pixels affected by the operation. This involves determining the offset vectors that correspond to the image pixels affected by the image editing operation. Further, the pixel values of the image pixels represented by the determined offset vectors are mapped to the affected image pixels. According to this mapping, the pixel values of the affected image pixels are set, which is effective to perform the image editing operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures.

DETAILED DESCRIPTION

Overview

Figure 1:
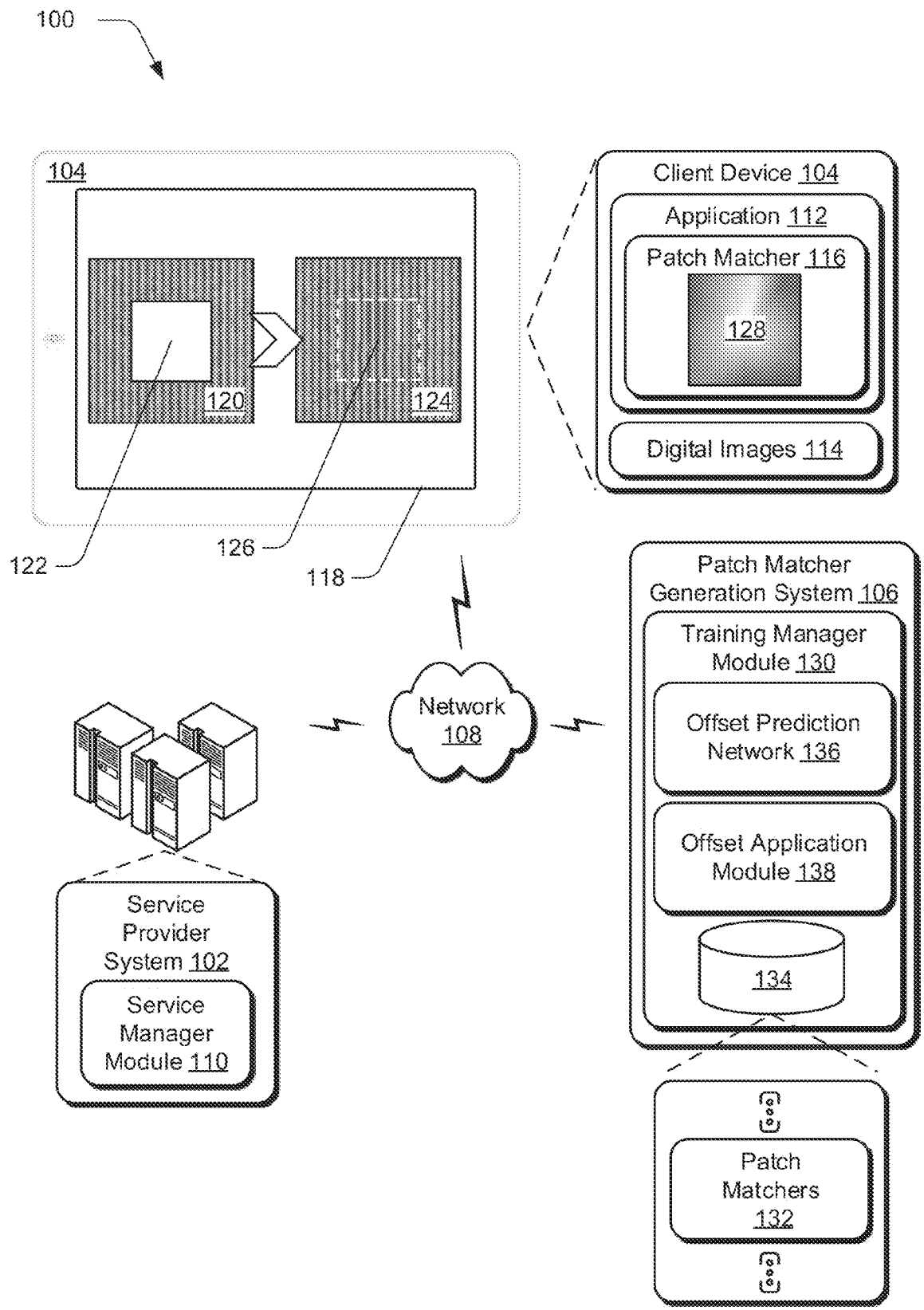
FIG. 1 is an illustration of an environment in an example implementation that is operable to employ techniques described herein.

Image patch matching is used in connection with different image editing operations, such image retargeting and image hole filling. Broadly speaking, patch matching involves copying values from a group of pixels in an image to the image's pixels that are affected by an operation. However, conventional patch matching techniques simply fail in some scenarios. This is because conventional patch matching techniques are based on low-level pixel values rather than semantic concepts that can be learned with deep learning. Typically, these conventional patch matching techniques attempt to locate a nearest patch (e.g., group of pixels) having pixel values that approximately match a patch that is subject to an image editing operation. In some scenarios, however, this mere matching of nearest patches results in edited images that are not semantically consistent, such as in a scenario that involves attempting to fill a hole located proximate a depicted person's eye. Accordingly, conventional patch matching techniques may be unsuitable for implementing various image-editing operations.

To overcome these problems, predicting patch displacement maps using a neural network is leveraged in a digital medium environment. Initially, a digital image is received relative to which an image editing operation is to be performed. Example image editing operations that can be implemented using the described techniques include hole filling, image retargeting (e.g., cropping, zooming, scaling, uncropping), optical flow prediction between two different images (e.g., video frames), future frame prediction for frames of videos, and so on. This image can be received in scenarios where a user selects to perform the operation, such as to select to retarget an image using an image editing application. Alternately or in addition, the image can be received in scenarios where a computing-device module selects to perform the operation, such as to select to retarget an image for object recognition. In any case, digital images can be provided to a patch matching system that is used to carry out a variety of operations without departing from the spirit or scope of the described techniques.

In general, these patch-matching systems are configured to output digital images that are edited with an editing operation involving patch matching. To do so, the patch matching system copies pixel values from groups of pixels of a digital image to the digital image's pixels that are affected by the operation. In contrast to conventional techniques, however, the described techniques utilize machine learning so that the patch matching preserves semantic concepts of an image, e.g., facial features. In one or more implementations, the patch matching system is configured to have a network framework that includes an offset prediction neural network, which is trained to recognize semantic concepts through exposure to different sets of training images. Moreover, the offset prediction neural network is trained for a specific image editing operation to learn changes that occur to images due to the image editing operations, such as changes that occur to images due to hole filling versus changes that occur to images due to cropping. To implement different image editing operations, differently trained offset prediction neural networks may be deployed.

In accordance with the described techniques, the offset prediction neural network is trained to generate offset predictions from the digital image relative to which the image editing operation is being performed. These offset predictions are digital content formed as displacement maps that include offset vectors, e.g., one vector for each pixel of the digital image. The offset vectors represent a displacement of image pixels of the digital image as it is input to different locations for performing the image editing operation. This displacement can be visualized using color-coded visualizations that represent the offset vectors using colors defined by a color-coding reference. In general, a location of a color in the color-coding reference corresponds to a vector that represents an image pixel located generally at a same location in the digital image. For instance, a color in the upper right corner of the color-coding reference corresponds to a vector representative of an image pixel in the upper right corner of the digital image.

In any case, the offset prediction serves as a basis for copying pixel values of the digital image to the image pixels affected by the operation. This involves determining the offset pixels that correspond to the image pixels affected by the image editing operation. In a hole-filling example, this involves determining the offset vectors that correspond to the image pixels that form the hole. Here, the pixel values of the image pixels represented by the determined offset vectors are mapped to the affected image pixels. In one or more implementations, this involves applying the determined offset vectors to the digital image to identify the image pixels that the vectors represent. Based on this, pixel values are mapped to the affected image pixels. According to this mapping, the pixels values of the affected image pixels are set, which is effective to perform the image editing operation.

By leveraging a neural network trained on sets of images, the patch matching system avoids outputting edited images having content that is semantically inconsistent. The patch matching system also outputs the edited images without post-processing operations. In so doing, the burden of having to perform post-processing operations is not imposed on patch matching systems configured according to the described techniques.

Term Descriptions

As used herein, the term "patch matching" refers to one or more techniques for copying values from a group of pixels in an image to other pixels of that image, e.g., the image's pixels that are subject to an image editing operation. Differences in these techniques include, in part, differences in manners for selecting the pixels from which the values are copied.

As used herein, the term "patch" refers to a group of pixels of an image or a group of patch pixels centered around an image pixel and generated based on nearby image pixels, e.g., via interpolation.

As used herein, the term "image pixels" refer to pixels of a digital image. In a similar manner, the term "offset vectors" refer to vectors of an offset prediction formed as a displacement map. In one or more implementations, the displacement map includes vectors that correspond to each image pixel of the digital image being edited and that also indicate a location of a mapped to image pixel.

In the following discussion, the term "hole" refers to a group of contiguous pixels of a digital image having values indicating an absence of depicted content. By way of example, these pixels may have null values or other values indicative of no content. In one or more implementations, these pixels may have values that cause the pixels to be displayed as white or as black. Indeed, the pixels may simply be associated with white or black pixel values. In any case, these holes appear to be inconsistent with remaining imagery depicted in holey digital images. Holes may be introduced into digital images based on a variety of operations as discussed herein.

The term "post-processing" refers to operations performed in relation to digital images to modify the depicted content of those images. By way of example, post-processing operations include zooming, cropping, scaling, blending, filtering, selective color changing, and so forth. Post-processing may encompass a variety of other image modification operations without departing from the spirit or scope of the described techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ predicting patch displacement maps using a neural network as described herein. The illustrated environment 100 includes a service provider system 102, client device 104, and patch matcher generation system 106 that are communicatively coupled, one to another, via a network 108.

Computing devices that are usable to implement the service provider system 102, client device 104, and patch matcher generation system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

The service provider system 102 is illustrated as including a service manager module 110 that is representative of functionality to provide services accessible via the network 108 to client device users. The service manager module 110, for instance, may expose content or functionality that is accessible via the network 108 by an application 112 of the client device 104. The application 112 may be configured as a network-enabled application, a browser, a native application, and so on, that obtains data from the service provider system 102 via the network 108. This data can be employed by the application 112 to enable a user of the client device 104 to communicate with the service provider system 102, such as to receive application updates and features when the service provider system 102 provides functionality to manage content editing applications.

In the context of the described techniques, the application 112 includes functionality to edit digital content, such as digital images 114. In the illustrated example, the application 112 includes patch matcher 116 that is implemented at least partially in hardware of the client device 104, in part, to match patches for at least one image editing operation. One example image editing operation involving patch matching is to fill holes of holey digital images. Broadly, speaking a "hole" refers to a region of contiguous pixels of a digital image having values indicating an absence of depicted content. In these regions, depicted content may have been removed, such that the corresponding pixels have null values, empty values, values for white pixels, values for black pixels, and so forth. A hole may be present in a digital image 114 due to a user of the client device 104 interacting with the application 112 to remove an object from a digital image, to erase a portion of the image, to cut a portion from the image, and so on. Alternately or in addition, the application 112 may introduce holes into the digital images, such as by removing portions of an image automatically, e.g., based on a user selection to remove particular content (e.g., profanity, trademarked content, blemishes, etc.), user selection of an auto-correction feature, and so on. The patch matcher 116 is also configured to match patches of the digital images 114 to retarget images (e.g., cropping, zooming, scaling), predict optical flow between two different images (e.g., video frames), predict a future frame of a video, and so on.

With regard to hole filling, the client device 104 is shown displaying, via display device 118, holey image 120 having hole 122. The patch matcher 116 is configured to fill the hole 122 of the holey image 120 to produce filled digital image 124. Rather than the hole 122, the filled digital image 124 includes mapped content 126. In general, the mapped content 126 comprises pixels having values that are mapped from pixels of the holey image 120 corresponding to depicted imagery—the non-hole pixels of the holey image 120. In one or more implementations, the patch matcher 116 generates a predicted offset of pixels from the holey image 120 to the pixels of the hole 122. This predicted offset is formed as a displacement map, which includes vectors that represent a displacement of image pixels of the holey image 120 as input to the patch matcher 116 to different locations to fill the hole 122. The predicted offset can be visualized using a predicted offset visualization that is color-coded according to a color-coding reference 128, which associates a unique color of a color model (e.g., the red green blue (RGB) color model) with the pixels of an image that is to be operated on, e.g., a holey image. By way of example, pixels located proximate a top right of the holey image 120 are associated with colors in the top right of the color-coding reference 128. When a visualization indicates a color from the top right of the color-coding reference 128 for a hole pixel, this corresponds to a vector that indicates to map a pixel value of the top-right pixel of the holey image to the hole pixel.

The patch matcher 116 determines the pixel values through the predicting and mapping substantially in real-time to generate the mapped content 126 so that, without post-processing, the mapped content 126 is consistent with remaining content of the holey image 120. The patch matcher 116 is also capable of using patch matching to fill multiple holes of a holey image and to fill holes for images having a variety of resolutions. In other words, the patch matcher 116 may be implemented using a fully convolutional end-to-end neural network that takes as input a holey image (having one or more holes) and outputs a predicted pixel offset formed as a displacement map to produce a filled digital image (where each of the holes is filled). In the context of other image editing operations that employ patch matching, the patch matcher 116 may be implemented using a fully convolutional end-to-end neural network that takes as input the image being operated on (e.g., an image being retargeted) and outputs a predicted pixel offset formed as a displacement map to produce the operated on image (where the imagery is retargeted according to the operation). In addition or alternately, the neural network may be configured as a feed-forward neural network.

To provide the client device 104 with the application 112 having the patch matcher 116, the service provider system 102 may leverage the patch matcher generation system 106. Although functionality of the patch matcher generation system 106 is illustrated as separate from the service provider system 102, this functionality may also be incorporated as part of the service provider system 102, further divided among other entities, and so forth. Additionally or alternately, an entirety or portions of the functionality of the patch matcher generation system 106 may be incorporated as part of the client device 104. The patch matcher generation system 106 includes a training manager module 130 that is implemented at least partially in hardware of a computing device, in part, to deploy deep learning to generate patch matchers 132, which are illustrated in storage 134. The patch matcher 116, for instance, may correspond to one of the patch matchers 132 generated using functionality of the training manager module 130.

To generate the patch matchers 132, the training manager module 130 is configured to train offset prediction network 136. In general, the offset prediction network 136 represents functionality to generate a prediction comprising a displacement map from an input image, e.g., the holey image 120. Broadly speaking, these displacement maps use vectors to represent a mapping of pixels in the input image to an image location to match patches in connection with carrying out an image editing operation, e.g., hole filling, image retargeting, optical-flow predicting, and so forth. Further, the predicted offsets are coded for visualization based on a color-coding reference, such as the color-coding reference 128.

To translate the offset vectors of the generated predictions, the training manager module 130 generates offset application module 138. The training manager module 130 combines the offset application module 138 with the offset prediction network 136 to form the patch matchers 132. In general, the offset application module 138 represents functionality to map pixels of an input image to affected-pixel locations and thus produce an output image. This mapping is based on an offset prediction formed as a displacement map, as generated by the offset prediction network 136. In other words, the displacement map serves as input to the offset application module 138. The offset application module 138 processes a vector of the displacement map to determine a pixel of the input image that the vector represents. Based on this, the offset application module 138 maps a pixel value of the input-image pixel represented by the vector to a pixel of an output image that corresponds to the vector. The offset application module 138 then adjusts the pixel values of the output image according to the mapping. In this way, the patch matchers 132 are capable of receiving an image to be operated on as input and providing an image relative to which the operations are carried out as output.

With regard to the network architecture, the training manager module 130 is capable of training the offset prediction network 136 to predict offsets for patch matching in connection with different operations, e.g., hole filling, image retargeting, optical-flow predicting, and so forth. The offset prediction network 136 thus learns to generate the offset predictions for different operations based on the data the network is exposed to during training by the training manager module 130. An advantage of the offset prediction is that it allows the offset prediction network 136 to be generated to match patches for various operations. The described framework, which combines the offset prediction network 136 and the offset application module 138, is thus more efficient than conventional systems because the described framework is usable for various operations—merely changing the training data can be effective to configure the offset prediction network 136 for use in connection with different image-editing operations. Additionally, the patch matchers 132 carry out these image-editing operations without utilizing post-processing techniques, e.g., color adjustment. Patch matchers configured according to the described techniques thus do not place the further burden on computing device resources of carrying out post-processing techniques during operation.

Having considered an example environment, consider now a discussion of some example details of the techniques for predicting patch displacement maps using a neural network in a digital medium environment in accordance with one or more implementations.

Predicting Patch Displacement Maps Using a Neural Network

Figure 2:
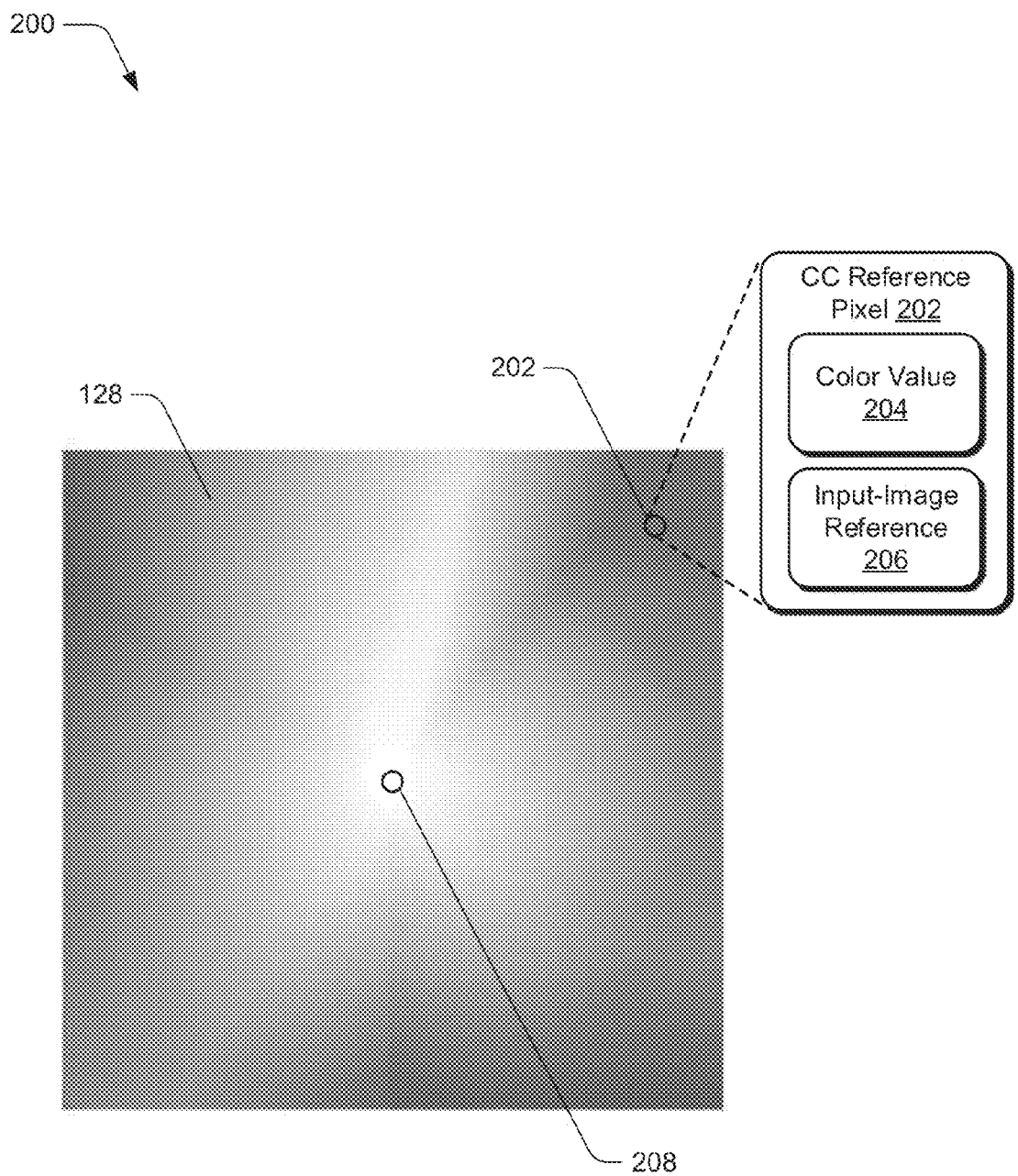
FIG. 2 depicts an example implementation of a color-coding reference used to visualize displacement maps for mapping pixels of an input image to the pixels affected by an image-editing operation based on predicted pixel offsets.

FIG. 2 depicts an example 200 of a color-coding reference used to visualize displacement maps for mapping pixels of an input image to the pixels affected by an image-editing operation based on predicted pixel offsets. In particular, the illustrated example includes the color-coding reference 128 of FIG. 1, but in more detail.

In general, the color-coding reference 128 comprises a plurality of pixels. A pixel of the color-coding reference 128 is associated with a unique color, relative to each other pixel of the color-coding reference 128. The color-coding reference 128's pixels also represent pixels of a digital image input to the patch matcher 116. The pixels of the color-coding reference 128 may be implemented using data structures, such that each pixel of the color-coding reference 128 corresponds to one of these data structures. In one or more implementations, a color-coding reference pixel data structure includes information indicative of the respective color-coding reference pixel's color (e.g., RGB values, a hex value, CMYK values, etc.) and information indicative of the input image's pixel that is represented by the color-coding reference pixel (e.g., a vector indicative of the represented pixel, etc.).

In one or more implementations, the information indicative of the input image's pixel corresponds to a vector. By way of example, a corresponding offset vector of a displacement map may be indicative of a displacement of a color-coding reference pixel from a center of the color-coding reference 128. Broadly speaking, this vector is used in relation to the input image to find the represented input image pixel, e.g., by determining which pixel of the input image is displaced by the amount indicated by the vector from the pixel to which the vector corresponds. This vector can also be used to indicate an amount a color-coding reference pixel is displaced from a center of the color-coding reference 128 to find the color for the visualization of the offset prediction.

As noted above, colors of the color-coding reference pixels may be described using different formats, e.g., RGB, hexadecimal, CMYK, and so forth. In general, the color-coding reference 128 is configured to include pixels, uniformly distributed, that correspond to a range of colors indicated by the color-coding reference 128. Consider an example in which the color-coding reference 128 is RGB-colored. In this example, the color-coding reference 128's pixels can be distributed to uniformly represent the RGB color model. In any case, the visualizations indicative of the predicted pixel offsets are limited to colors of the color-coding reference 128.

With this, consider color-coding reference pixel 202 ("CC reference pixel 202") of the illustrated example 200. In the color-coding reference 128, the CC reference pixel 202 is indicated by a circle, which, for the sake of clarity, represents a single pixel of the color-coding reference 128. A data structure that may be used to implement the CC reference pixel 202 is also illustrated. In the illustrated example, the CC reference pixel 202 includes color value 204 and input-image reference 206. Nevertheless, the pixels of the color-coding reference 128 may be configured differently without departing from the spirit or scope of the techniques described herein.

With regard to the illustrated example 200, the color value 204 describes a color of the CC reference pixel 202 in the color-coding reference 128. In the illustrated example, the CC reference pixel 202 is depicted having a green color.

Accordingly, the color value 204 describes this green color of the CC reference pixel 202. The offset application module 138 maps vectors of the predicted offsets that are visualized using this same green color to the CC reference pixel 202, and not to other pixels of the color-coding reference 128. The offset application module 138 also uses the vector to determine which pixel of the input image is represented by vector, so that a pixel value (e.g., one or more color values) of the represented pixel can be mapped to a pixel of the output image that corresponds to the vector.

In this context, consider the input-image reference 206, which indicates a pixel of an input image that the CC reference pixel 202 represents. In this illustration 200, the CC reference pixel 202 is located in a top right of the color-coding reference 128. Based on this, the input-image reference 206 indicates a pixel in a top right of the input image. As noted above, the pixel of the input image is described by a vector, e.g., one that can also be used to describe displacement of the CC reference pixel 202 from the CCR center pixel 208.

In any case, the offset application module 138 identifies a pixel of the input image that is described by the offset vector. This may also be represented in a visualization of an offset prediction by the CC reference pixel 202. Obviously, the offset application module 138 is capable of identifying pixels of the input image that are visualized by the color-coding reference 128's pixels having colors other than the green of the CC reference pixel 202. The offset application module 138 uses this information to map values of the represented pixels of the input image to output-image pixels affected by an operation, e.g., hole filling. In this context, consider FIG. 3.

Figure 3:
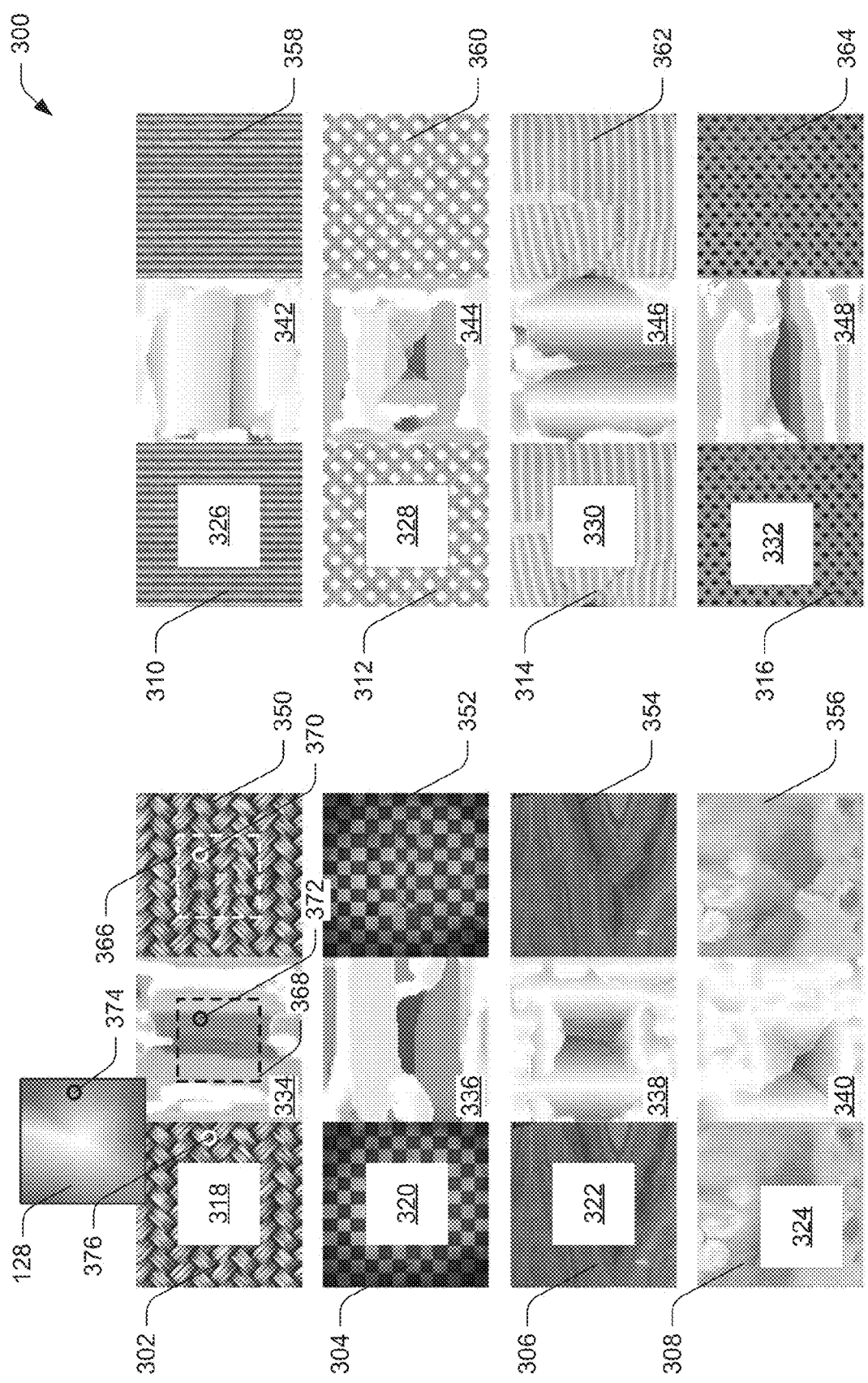
FIG. 3 depicts an example of holey digital images and corresponding filled digital images that are generated using predicted pixel offsets, which are indicative of a mapping between remaining pixels of the holey digital images and pixels of the holes.

FIG. 3 depicts an example 300 of holey digital images and corresponding filled digital images that are generated using predicted pixel offsets, which are indicative of a mapping between remaining pixels of the holey digital images and pixels of the holes.

In particular, the illustrated example 300 includes holey pattern images 302, 304, 306, 308, 310, 312, 314, 316 having holes 318, 320, 322, 324, 326, 328, 330, 332. The illustrated example 300 also includes visualizations 334, 336, 338, 340, 342, 344, 346, 348 indicative of offset predictions formed as displacement maps and filled pattern images 350, 352, 354, 356, 358, 360, 362, 364. In accordance with the described techniques, the patch matcher 116, formed as a combination of the offset prediction network 136 and the offset application module 138, is configured to generate these filled images from the holey images.

Given the holey pattern image 302, for instance, the patch matcher 116 employs the offset prediction network 136 to generate an offset prediction, which is visualized with visualization 334. The patch matcher 116 then provides the holey pattern image 302 and the offset prediction as input to the offset application module 138. Given this input, the offset application module 138 operates as described above and below to output the filled pattern image 350, which includes hole-filling content 366 in place of the hole 318. In this example, the visualization 334 is depicted with box 368, which corresponds to the pixels of the hole 318 and the pixels of the hole-filling content 366. Additionally, filled pixels 370 of the hole-filling content 366 correspond to color-coded offset pixels 372 of the visualization 334. The offset application module 138 uses the vectors visualized by the visualization 334 to map pixels of the holey pattern image 302 to the pixels of the hole 318 and thus produce the hole-filling content 366.

To map these pixels, the offset application module 138 determines vectors indicated by the color-coded offset pixels 372. The offset application module 138 is further configured to identify pixels of the color-coding reference 128 that are indicated by the offset vector, e.g., to generate the visualization 334. In the illustrated example 300, matching color pixels 374 represent the pixels of the color-coding reference 128 that match vectors indicated by the color-coded offset pixels 372. These matching color pixels 374 are also indicative of pixels of the holey pattern image 302. The matching color pixels 374 are located near a right side and just above a vertical middle of the color-coding reference 128. This location of the matching color pixels 374 can be described by the offset vectors, as described above. In any case, the matching color pixels 374 represent input-image pixels 376 near a right side and just above a vertical middle of the holey pattern image 302. The offset application module 138 can identify the input-image pixels 376 based on the displacement indicated by the offset vector. Given this, the offset application module 138 uses the values of the input-image pixels 376 to set values of the filled pixels 370. In other words, the pixel values of the input-image pixels 376 are mapped to the filled pixels 370.

Though not labeled with reference numbers, the other filled images of the illustrated example 300 are also depicted with respective hole-filling content. The hole-filling content of these images is generated by the patch matcher 116 in a same manner as described just above. Consider now an example system in accordance with one or more implementations.

Figure 4:
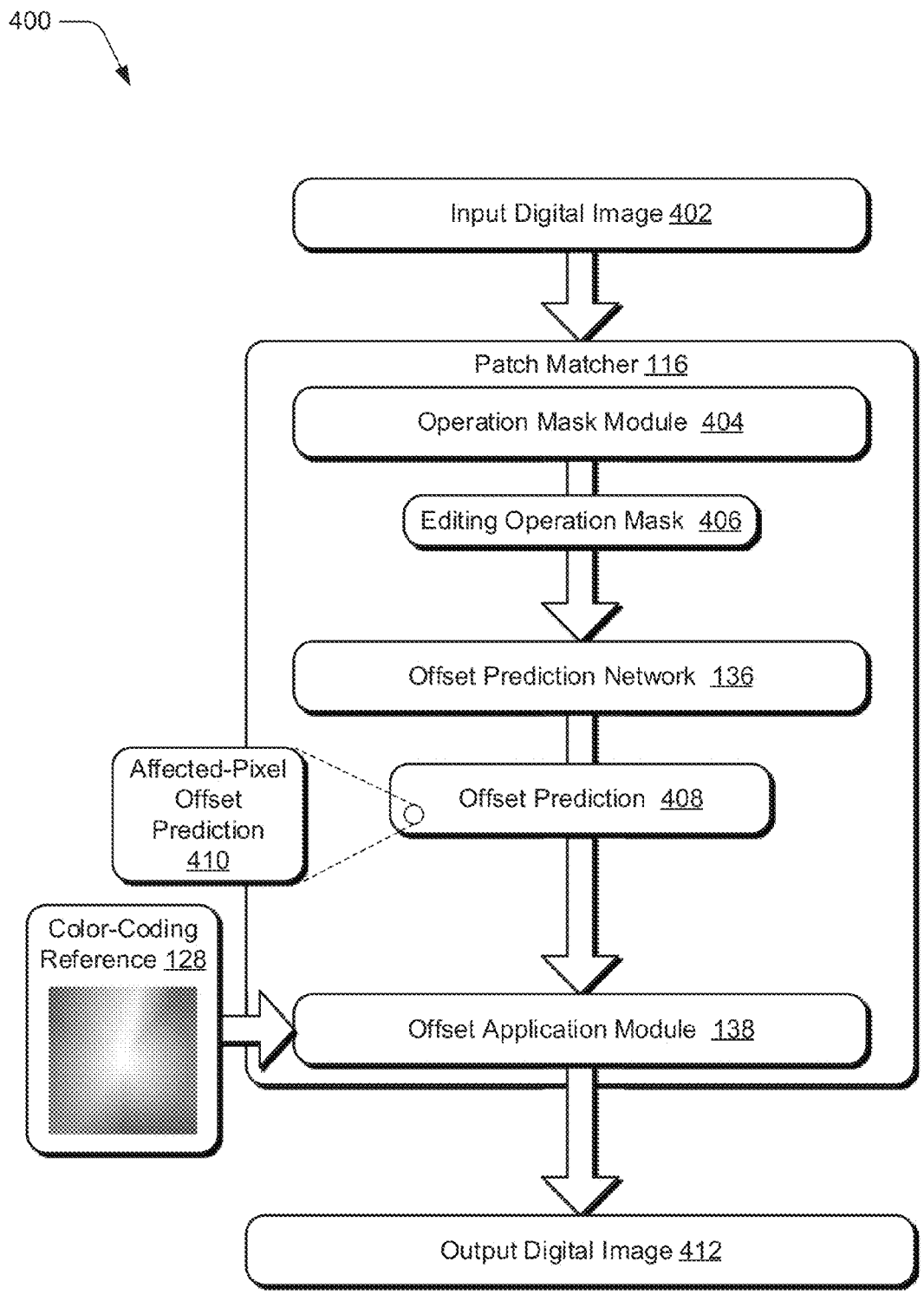
FIG. 4 depicts an example implementation in which a patch matching system generates an output digital image using predicted pixel offsets indicative of a mapping from pixels of an input digital image to pixels affected by an operation performed in relation to the input digital image.

FIG. 4 depicts an example implementation 400 in which a patch matching system generates an output digital image using predicted pixel offsets indicative of a mapping between pixels of an input digital image and pixels affected by an operation performed in relation to the input digital image. In the illustrated example, the patch matcher 116 of FIG. 1 is illustrated in more detail and serves as at least a portion of the patch matching system. The patch matcher 116 is further depicted including the offset prediction network 136 and the offset application module 138. As indicated above, the training manager module 130 forms the patch matcher 116 as a combination of these.

In this example 200, the patch matcher 116 is shown obtaining input digital image 402. The input digital image 402 corresponds to an image relative to which an image-editing operation that involves patch matching is being performed. By way of example, a user of the client device 104 may select an option via the application 112 to perform an operation involving patch matching in relation to the input digital image 402, such as filling a hole of the input digital image 402, retargeting (e.g., cropping, zooming, scaling) the input digital image 402, predicting optical flow between the input digital image 402 and another digital image (e.g., where the input digital image 402 and other digital image correspond to frames of a video), predicting a future frame of a video from the input digital image 402, and so forth.

Broadly speaking, these operations affect pixels of the input digital image 402. In a hole-filling example, for instance, the pixels corresponding to a hole of the input digital image 402 are affected by the operation, e.g., the pixels corresponding to the hole are given values to fill the hole with content. In this context, the patch matcher 116 is also depicted having operation mask module 404, which represents functionality to generate editing operation mask 406. The editing operation mask 406 is configured to indicate the pixels in the input digital image 402 that are affected by the operation being performed in relation to the input digital image 402.

To indicate this, the editing operation mask 406 may include a value for each pixel of the input digital image 402 that indicates whether the pixel is affected by the operation or not. For instance, the editing operation mask 406 may include a value of '1' for pixels of the input digital image 402 that are not affected by the operation and a value of '0' for pixels of the input digital image 402 that are affected by the operation, e.g., pixels corresponding to a hole of the input digital image 402 that is to be filled. Alternately, the editing operation mask 406 may include a value of '0' for pixels of the input digital image 402 that are not affected by the operation and a value of '1' for pixels of the input digital image 402 that are affected by the operation. The editing operation mask 406 may indicate the affected pixels of the input digital image 402 in different ways without departing from the spirit or scope of the techniques described herein.

In any case, the offset prediction network 136 receives the input digital image 402 and the editing operation mask 406 as input. The offset prediction network 136 generates an offset prediction 408 as a displacement map from the input digital image 402 and the editing operation mask 406. The offset prediction 408 includes affected-pixel offset prediction 410. The affected-pixel offset prediction 410 corresponds to the pixels of the input digital image 402 affected by the operation. In particular, the affected-pixel offset prediction 410 of a particular pixel corresponds to a mapping of a source pixel of the input digital image 402 to the particular pixel. Consider an example in which the operation being performed is hole-filling operation. In this example, the affected-pixel offset prediction 410 includes for pixels of a particular hole, offset vectors that indicate pixels of the input digital image 402. This mapping is used to modify values of the pixels of the particular hole indicating empty and/or removed content to instead indicate mapped patches from the input digital image 402. In particular, the offset prediction network 136 generates these predicted offsets based on depicted-content characteristics learned during training and, in part, on pixel values of the pixels of the input digital image 402 that are not affected by the operation.

The offset application module 138 receives the offset prediction 408 with the affected-pixel offset prediction 410. The offset application module 138 matches patches of the input digital image 402 to the affected pixels to modify the values of those pixels based on the offset vectors included in the offset prediction 408. The offset application module 138 may match these patches as described in more detail in relation to FIGS. 2 and 3. The offset application module 138 produces output digital image 412 by mapping values of pixels of the input digital image 402 to the pixels affected by the image editing operation and according to the offset prediction 408—specifically according to the affected-pixel offset prediction 410. It is through generating the offset prediction 408 for a given operation and mapping values to pixels affected by the operation according to the offset that the patch matcher 116 is able to output the output digital image 412 without post-processing, e.g., blending, color adjusting, and so forth.

To learn characteristics of these different operations, and thus generate offset predictions as displacement maps, the training manager module 130 can train the offset prediction network 136 by exposing it to operation-specific training images. The framework of the offset prediction network 136 supports this operation-specific type of training. This operation-specific training supported by the framework further enables offset prediction networks to generate the offset predictions for carrying out different image editing operations. For a further discussion of the framework, consider FIG. 5 in accordance with one or more implementations.

Figure 5:
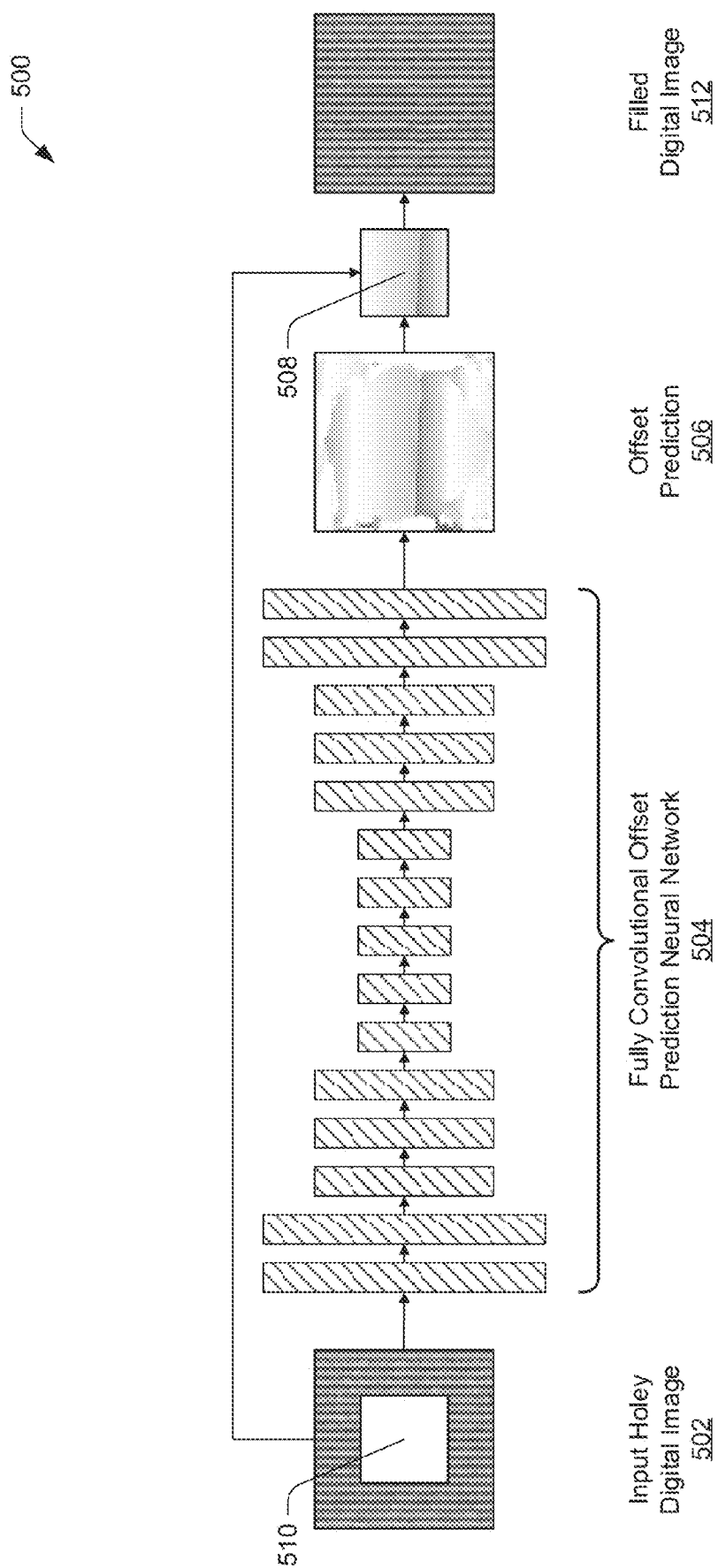
FIG. 5 depicts an example implementation of a patch-matching network framework trained using deep learning and that generates offset predictions formed as displacement maps.

FIG. 5 depicts an example 500 of an implementation of a patch-matching network framework that is trained using deep learning and that generates offset predictions formed as displacement maps. In accordance with the described techniques, the illustrated example 500 depicts a fully convolutional network framework.

The illustrated example 500 includes input holey digital image 502, which serves as input to fully convolutional offset prediction neural network 504. In one or more implementations, the offset prediction network 136 is configured as and thus corresponds to the fully convolutional offset prediction neural network 504. Further, the fully convolutional offset prediction neural network 504 may be configured as a feed-forward neural network. In one or more implementations, the fully convolutional offset prediction neural network 504 includes intermediate dilated convolution layers. For instance, the fully convolutional offset prediction neural network 504 includes four such dilated convolution layers. The fully convolutional offset prediction neural network 504 also has channels, the numbers for which are varied depending on a training dataset, e.g., depending on whether the dataset comprises images selected to train the network for hole-filling operations, images selected to train the network for image-retargeting operations, and so on. Though varied, the training manager module 130 may be configured to select these channel numbers in sets, e.g., sets of {32, 64, 128, 256}. Additionally, the training manager module 130 configures the fully convolutional offset prediction neural network 504 with fully connected layers at an end in discriminator-network configurations.

Further, the illustrated example 500 depicts visualizations of offset prediction 506 and affected-pixel offset prediction 508. The affected-pixel offset prediction 508 comprises a portion of the offset prediction 506 that corresponds to affected pixels 510 (e.g., the hole) of the input holey digital image 502. The visualization of the affected-pixel offset prediction 508 is color-coded in accordance with the described techniques (e.g., according to the color-coding reference 128) and is indicative of the displacement map output by the fully convolutional offset prediction neural network 504. In particular, the affected-pixel offset prediction 508 is output by an output layer of the fully convolutional offset prediction neural network 504.

By comparison, the filled digital image 512 corresponds to output of the offset application module 138 and thus output of the network framework. Accordingly, the illustrated network framework is an end-to-end deep neural network that takes images being operated on as input and outputs images in which the operation has been carried out. In particular, the image-editing operation is carried out by applying the predicted offsets on pixels affected by the operation. Configuring the framework in this way enables the framework to be leveraged to carry out image-editing operations to produce edited digital images that are more boundary consistent, semantically reasonable, and visually pleasing than conventional techniques. This configuration also produces these images more efficiently than conventional techniques, e.g., in less time and using fewer resources. In one or more implementations, the training manager module 130 generates and trains the framework of the illustrated example 500 as follows.

In accordance with the described techniques, the training manager module 130 generates the fully convolutional offset prediction neural network 504 based on a differentiable patch matching kernel. In so doing, the illustrated network framework 500 produces a more stable convergence than conventional techniques based on a generative adversarial network. Thus, the illustrated network framework is trained without employing generative adversarial training techniques. During training, the training manager module 130 configures the fully convolutional offset prediction neural network 504 to generate offset predictions according to a patch based objective function. As part of this, the training manager module 130 constructs a patch-based training data structure for each of the training images.

In the following discussion, a height of a training image is represented by the term H and a width of the training image is represented by the term W. In one or more implementations, pixel colors of the training images are represented using the red-green-blue (RGB) color model and thus have values for three channels. Additionally, the training manager module 130, for each pixel of a training image, may determine an exact patch centered on the pixel. In one or more implementations, the determined exact patch has dimensions of seven-by-seven. In this example, the training manager module 130 may thus generate a patch-based training data structure for an image with the following dimensions:

$$H \times W \times 7 \times 7$$

In one or more implementations, the training manager module 130 randomly removes ground truth patches from training images to produce holes in the training images, e.g., when the training manager module 130 trains the fully convolutional offset prediction neural network 504 for hole filling. The training manager module 130 is configured to modify the training images differently depending on an operation for which the fully convolutional offset prediction neural network 504 is being trained. With regard to the hole-filling example, though, the training manager module 130 provides holey training images to the fully convolutional offset prediction neural network 504. During training, the fully convolutional offset prediction neural network 504 produces offset predictions formed as displacement maps for these holey training images, and the offset application module 138 produces filled digital images according to the offset predictions.

The training manager module 130 is configured to compare these filled images output by the framework against the original training images, e.g., the images from which the ground truth patches are removed. Additionally, the training manager module 130 is configured to compare the content generated, based on mapping pixels to the holes according to the offset predictions, to fill the holes to the ground truth patches removed to produce the holes. In one or more implementations, the training manager module 130 compares the ground truth patches to the hole-filling content (or content of the affected pixels for other operations) based on an $l_1$ loss. By way of example, this loss may correspond to an $l_1$ distance computed based on the H×W×7×7 patches of the original training images and H×W×7×7 patches extracted from the output images that result from the offset predictions. The training manager module 130 provides feedback to the fully convolutional offset prediction neural network 504 through back propagation based on the computed $l_1$ distance. Using the objective function involving the H×W×7×7 patches is further effective to improve a sharpness of the images output by the fully convolutional offset prediction neural network 504. In other words, use of the H×W×7×7 patches is effective to produce images that are less blurry than techniques that utilize H×W patches.

Further, the training manager module 130 is configured to deploy a back-propagation algorithm to train the fully convolutional offset prediction neural network 504. To deploy such back propagation algorithms, the training manager module 130 uses a differentiable technique to sample pixels of the offset predictions generated during training. In one or more implementations, the training manager module 130 samples these pixels by using float values of the offsets, as output by the fully convolutional offset prediction neural network 504, and bilinear interpolation.

Broadly speaking, the training manager module 130 trains the fully convolutional offset prediction neural network 504 to generate offset predictions that, when applied to input images, result in output images with boundary consistent, semantically reasonable, and visually pleasing content. Through the training process, the training manager module 130 improves the offset predictions that are output so that after the training, the output images have content that is more boundary consistent, semantically reasonable, and visually pleasing than the images output at the beginning of training. To accomplish this, the training manager module 130 utilizes an operator to apply the offset predictions to the original training images, e.g., before holes are introduced. In one or more implementations, the training manager module 130 leverages a sampling kernel as this operator.

In discussing an example sampling kernel, the term $o_{i,j}$ represents an offset of an image pixel located at x-coordinate i and y-coordinate j. In one or more implementations, the training manager module 130 computes the offset $o_{i,j}$ for the pixel located at (i, j) by interpreting a bilinear interpolation of nearby pixels. In this discussion, the term l represents a floor of the offset o, such that l=floor(o). Further, the term u is equivalent to the offset floor l plus one, such that u=l+1. The term 'diff' represents a difference between the offset o and the offset floor l, such that diff=o−l. The term 'neg_diff' represents a difference between one and the offset-and-floor difference 'diff' such that neg_diff=1.0−diff. To this extent, the training manager module 130 leverages the following sampling kernel in one or more implementations:

$$S(o) = x_l \times \text{neg\_diff}_w \times \text{neg\_diff}_h + x_u \times \text{diff}_w \times \text{diff}_h + x_{l_h, u_w} \times \text{neg\_diff}_h \times \text{diff}_w + x_{u_h, l_w} \times \text{diff}_h \times \text{neg\_diff}_w$$

Here, the term S(o) represents the pixel sampling of the offset o. By using this sampling kernel, the training manager module 130 deploys differentiable sampling of the pixels of the offset predictions generated during training. It is through this differentiable sampling of the offset prediction that the training manager module 130 fully trains the fully convolutional offset prediction neural network 504 end-to-end.

Having discussed example details of the techniques for predicting patch displacement maps using a neural network, consider now some example procedures to illustrate additional aspects of the techniques.

Example Procedures

This section describes example procedures for predicting patch displacement maps using a neural network in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, the procedures are performed by a suitably configured device, such as the client device 104 of FIG. 1 that makes use of a patch matcher 116 or patch matcher generation system 106 that makes use of the training manager module 130.

Figure 6:
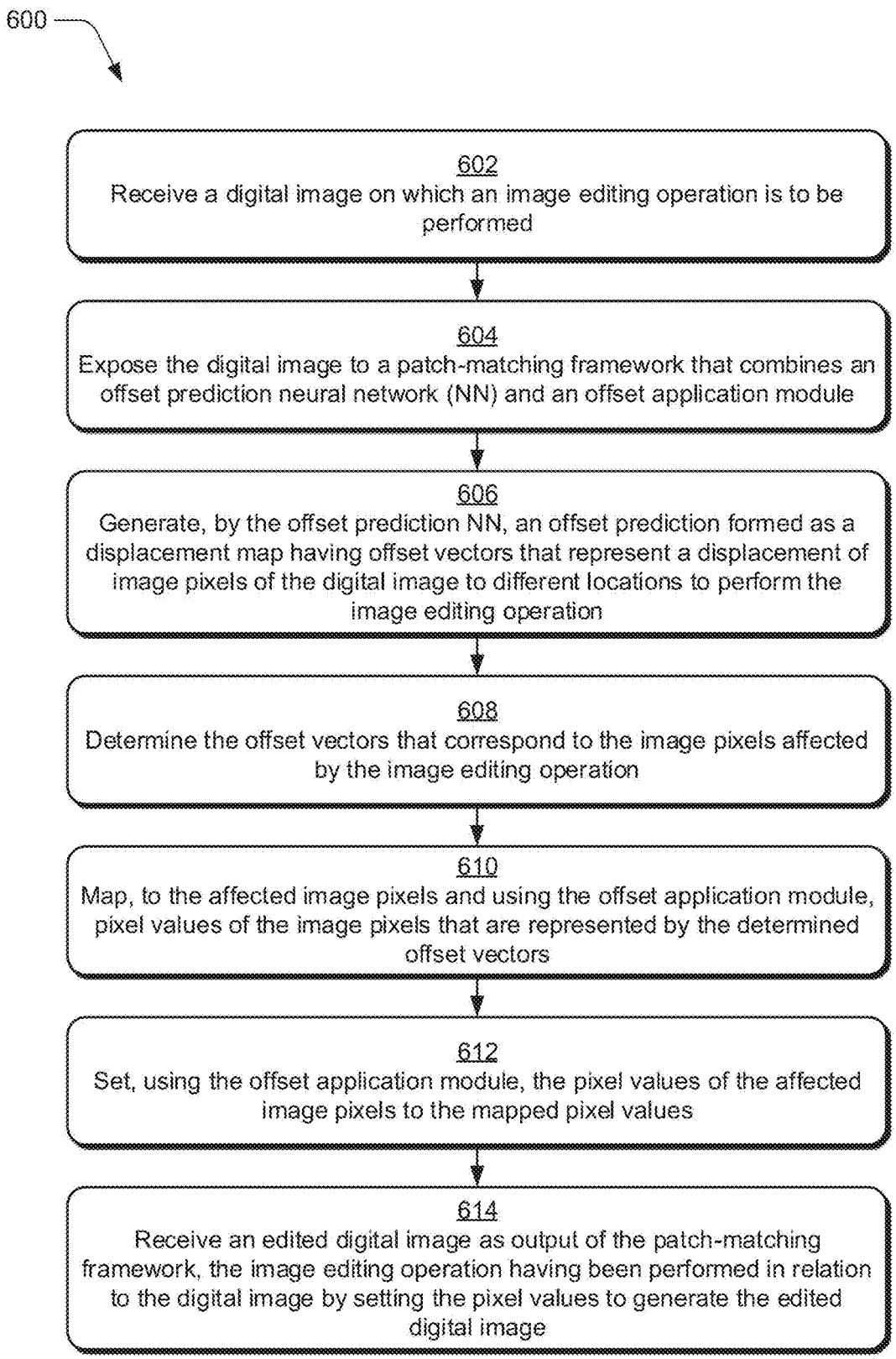
FIG. 6 depicts a procedure in an example implementation in which an image editing operation is carried out on a digital image by mapping pixels of the digital image to the pixels affected by the operation according to an offset prediction formed as a displacement map.

FIG. 6 depicts an example procedure 600 in which an image editing operation is carried out on a digital image by mapping pixels of the digital image to the pixels affected by the operation according to an offset prediction formed as a displacement map.

A digital image is received in relation to which an image editing operation is to be performed (block 602). By way of example, the patch matcher 116 obtains the holey pattern image 302 having the hole 318. In this example, the patch matcher 116 obtains the holey pattern image 302 to perform hole filling as the image editing operation. Although the procedure 600 is discussed with reference to a hole-filling example, it is to be appreciated that the image editing operation may correspond to different operations without departing from the spirit or scope of the techniques described herein, such as image retargeting (e.g., cropping, zooming, scaling), predicting optical flow between video frames, predicting future frames of a video from the received digital image, and so forth.

The digital image is exposed to a patch-matching framework that combines an offset prediction neural network and an offset application module (block 604). By way of example, the patch matcher 116 exposes the holey pattern image 302 to a patch-matching framework that combines the offset prediction network 136 and the offset application module 138. The offset prediction network 136 and the offset application module 138 can be combined by the training manager module 130.

An offset prediction formed as a displacement map is generated by the offset prediction neural network of the patch-matching framework (block 606). In accordance with the principles discussed herein, the displacement map comprises offset vectors that represent a displacement of image pixels of the digital image as it is input to different locations for performing the image editing operation. By way of example, the offset prediction network 136 generates the offset prediction indicated by the visualization 334. The offset vectors of the offset prediction indicated by the visualization 334 represent pixels of the holey pattern image 302. For instance, the vectors indicated by the color-coded offset pixels 372 represent input-image pixels 376. The pixels of the holey pattern image 302 that the visualization's colors represent are defined by the color-coding reference 128.

The offset vectors of the offset prediction that correspond to the image pixels affected by the image editing operation are determined (block 608). By way of example, the offset application module 138 determines that the vectors indicated by the box 368 of the visualization 334 correspond to the hole 318's pixels. These offset vectors include those indicated by the color-coded offset pixels 372 of the visualization 334. In this example, the hole 318's pixels are the image pixels affected by the image editing operation, e.g., the hole-filling operation.

Pixel values of the image pixels that are represented by the vectors are mapped to the affected image pixels by the offset application module (block 610). By way of example, the offset application module 138 identifies the input-image pixels 376 by referencing the vectors, which are indicated in the visualization 334 by the color-coded offset pixels 372. Based on this, the offset application module 138 maps pixel values of the input-image pixels 376 to the filled pixels 370.

The pixel values of the affected image pixels are set by the offset application module to the mapped pixel values (block 612). By way of example, the offset application module 138 sets values of the hole 318's pixels to the pixel values mapped at block 610. An edited digital image, with the image editing operation performed, is received as output from the patch-matching framework (block 614). In accordance with the principles discussed herein, the image editing operation is performed in relation to the digital image to generate the edited digital image by setting the pixel values of the affected pixels to the mapped pixel values. By way of example, the application 112 receives filled pattern image 350 as output from the patch matcher 116. The above-mentioned hole filling has been performed in relation to the holey pattern image 302 to produce the filled pattern image 350 by setting the values of the affected pixels at block 612. The filled pattern image 350 is received from the patch matcher 116 without post-processing the filled pattern image 350 as it is output by the patch-matching framework. In this way, the patch-matching framework may be considered end-to-end fully convolutional. The patch-matching framework may also be implemented so that the respective neural network is a feed-forward neural network.

Figure 7:
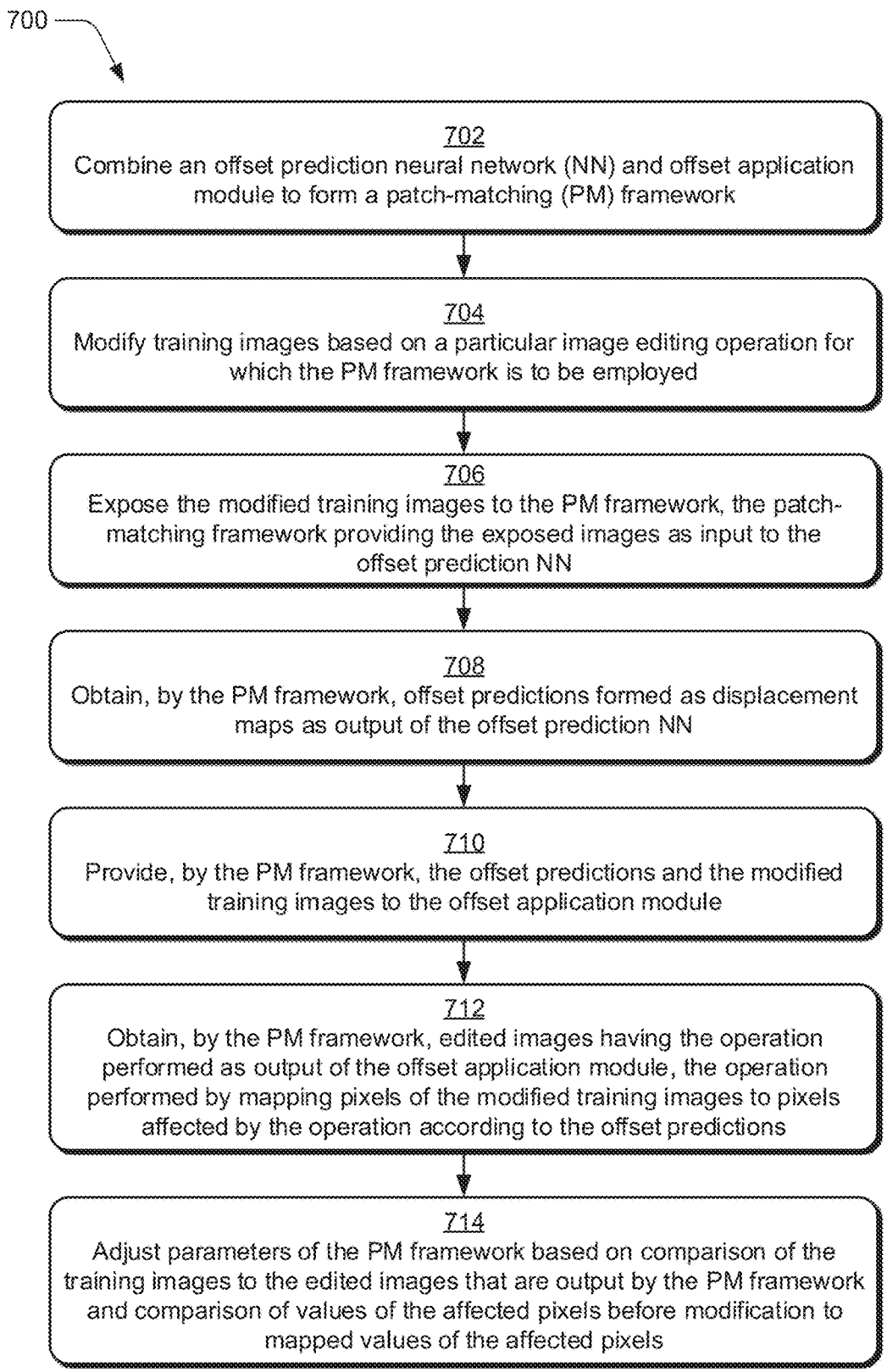
FIG. 7 depicts a procedure in an example implementation in which a network framework is formed to carry out image editing operations using patch matching that is based on offset predictions formed as displacement maps generated by the framework.

FIG. 7 depicts an example procedure 700 in which a network framework is formed to carry out image editing operations using patch matching that is based on offset predictions formed as displacement maps generated by the framework.

An offset prediction neural network is combined with an offset application module to form a patch-matching framework (block 702). By way of example, the training manager module 130 combines the fully convolutional offset prediction neural network 504 with the offset application module 138 to form the patch-matching framework of the illustrated example 500.

Training images are modified based on a particular image editing operation for which the patch-matching framework is to be employed (block 704). By way of example, to train the framework for hole filling, the training manager module 130 removes regions from each image of one or more sets of training images. For instance, the training manager module 130 removes regions from training images (not shown) to introduce the holes 318, 320, 322, 324, 326, 328, 330, 332 and thus produce the holey pattern images 302, 304, 306, 308, 310, 312, 314, 316. In this example, these holey pattern images have been modified from original versions without holes. It is to be appreciated that the training manager module 130 modifies the training images based on the particular image editing operation for which the patch-matching framework is to be employed. For instance, the training manager module 130 modifies the training images differently in scenarios where the patch-matching framework is employed to implement cropping operations. The training manager module 130 is configured to modify training images in various ways to train the patch-matching framework to carry out different image-editing operations without departing from the spirit or scope of the described techniques.

The modified training images are exposed to the patch-matching framework (block 706). In accordance with the principles discussed herein, the patch-matching framework provides the exposed images as input to the offset prediction neural network. By way of example, the training manager module 130 exposes the training images modified at block 704 to the patch-matching framework of the illustrated example 500. In so doing, the training manager module 130 initiates training of this framework. During training, the framework learns to generate offset predictions formed as displacement maps to carry out the particular image editing operation in relation to the modified training images. This learning is based, in part, on determining exact patches centered on the pixels of the training images and also by learning weights of an objective function.

Offset predictions formed as displacement maps are obtained by the patch-matching framework as output of the offset prediction neural network (block 708). By way of example, the training manager module 130 obtains offset predictions formed as displacement maps as generated by the fully convolutional offset prediction neural network 504. The offset predictions and modified training images are provided by the patch-matching framework to the offset application module (block 710). By way of example, the training manager module 130 provides the modified training images produced at block 704 and the offset predictions obtained at block 708 to the offset application module 138.

Images having the operation performed are obtained as output of the offset application module (block 712). In accordance with the principles discussed herein, the operation is performed by mapping pixels of the modified training images that are input to pixels affected by the operation according to the offset predictions. By way of example, the training manager module 130 obtains images as output from the offset application module 138. The particular image editing operation has been performed on these images by way of the offset application module 138 mapping pixels of the modified training images that are exposed to the patch-matching framework at block 706 to the pixels affected by the operation. The offset application module 138 performs this mapping based on the offset predictions provided at block 710.

Parameters of the patch-matching framework are adjusted based on a comparison of the training images to the edited images output by the patch-matching framework (block 714). In accordance with the principles discussed herein, the parameters are further adjusted based on comparing values of the affected pixels before the modification at block 704 to mapped values of the affected pixels. By way of example, the training manager module 130 compares the images output by the framework as having been operated on to the training images. The training manager module 130 also compares values of the training image pixels that correspond to affected pixels before modification at block 704 and the values mapped to those pixels at block 712. In one or more implementations, the training manager module 130 makes these comparisons by computing losses using an $l_1$ distance based on H×W×7×7 patches of the original training images and H×W×7×7 patches extracted from the images obtained at block 712. As part of computing the distance, the training manager module 130 leverages a sampling kernel as discussed above to take differentiable samples of the offset prediction pixels. Based on these computed distances, the training manager module 130 adjusts parameters of the framework, such as parameters of dilated convolution layers. In this way, the framework learns to generate offset predictions that, when applied, result in output images where pixels affected by an image editing operation have content that is boundary consistent, semantically reasonable, and visually pleasant with other content of the image.

Having described example procedures in accordance with one or more implementations, consider now an example system and device that can be utilized to implement the various techniques described herein.

Example System and Device

Figure 8:
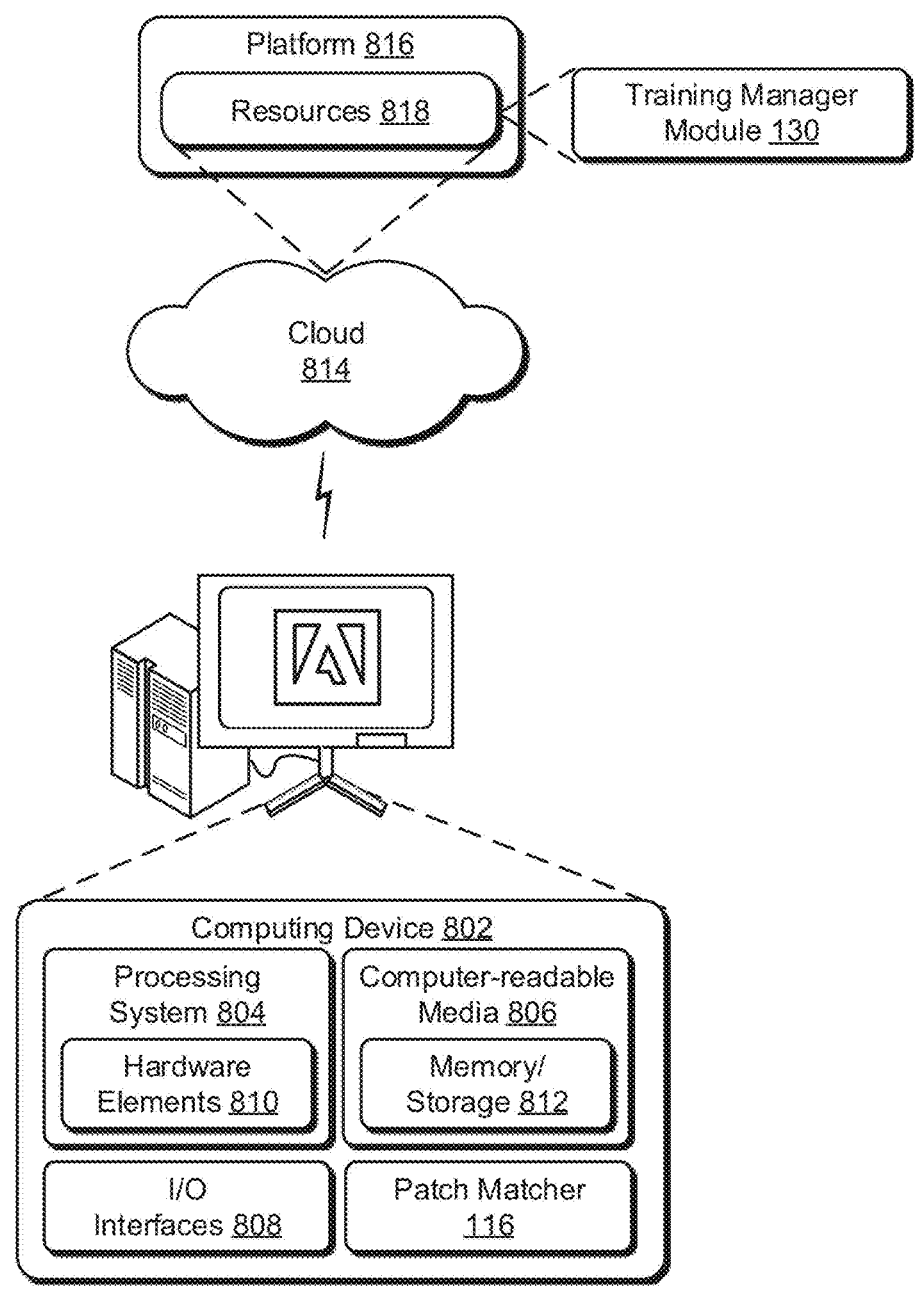
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the patch matcher 116 and the training manager module 130. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to perform image editing operations involving patch matching, a method implemented by a computing device, the method comprising:
    receiving, by the computing device, a digital image relative to which an image editing operation is to be performed;
    exposing, by the computing device, the digital image to a patch matcher having an offset prediction neural network; and receiving, by the computing device, an edited digital image as output from the patch matcher, the patch matcher performing the image editing operation in relation to the digital image to generate the edited digital image for the output by:
  generating, with the offset prediction neural network, an offset prediction as a displacement map, the displacement map comprising offset vectors that represent a displacement of image pixels of the digital image for performing the image editing operation;
  determining the offset vectors that correspond to the image pixels affected by the image editing operation;
  mapping pixel values of the image pixels that are represented by the determined offset vectors to the affected image pixels, and
  setting pixel values of the affected image pixels according to the mapping.

2. A method as described in claim 1, wherein the mapping further comprises identifying an image pixel that is represented by an offset vector by computing a location of the identified image pixel based on the displacement described by the offset vector in relation to a corresponding image pixel affected by the operation.

3. A method as described in claim 1, wherein the offset prediction neural network generates the offset prediction as the displacement map based on image characteristics learned by exposure to training images during training rather than determining a nearest neighbor patch based on pixel values.

4. A method as described in claim 1, wherein the offset prediction neural network comprises a convolutional neural network having intermediate dilation layers for performing one or more convolution operations as part of generating the offset prediction as the displacement map for the image editing operation.

5. A method as described in claim 1, wherein the offset prediction neural network is trained using a differentiable sampling to sample the offset vectors of offset predictions generated by the offset prediction neural network during training.

6. A method as described in claim 1, wherein the edited digital image is received as output from the patch matcher without image post-processing operations being performed in relation to the affected image pixels.

7. A method as described in claim 1, wherein the offset prediction neural network is trained to generate offset predictions for the image editing operation, the image editing operation comprising one operation of a plurality of image editing operations involving patch matching, the plurality of image editing operations including at least one of:
  a hole-filling operation;
  an image retargeting operation;
  an optical flow prediction operation; or
  a future video-frame prediction operation.

8. A method as described in claim 1, further comprising:
  receiving a holey digital image having at least one hole comprising a group of contiguous image pixels with values indicating an absence of depicted imagery;
  exposing the holey digital image to the patch matcher;
  receiving a filled digital image as output from the patch matcher, the filled digital image including hole-filling digital content in place of the at least one hole, the patch matcher outputting the filled digital image by:
    generating the offset prediction as the displacement map with the offset prediction neural network, the offset vectors representing a displacement of the image pixels of the holey digital image configured to fill the hole of the holey digital image;
    determining the offset vectors that correspond to the hole of the holey digital image;
    mapping the pixel values of the image pixels that are represented by the determined offset vectors to the image pixels of the hole, and
    setting the pixel values of the image pixels of the hole according to the mapping effective to fill the hole with depicted content.

9. A method as described in claim 8, wherein the holey digital image has multiple holes.

10. A method as described in claim 1, wherein receiving the digital image, exposing the digital image, and receiving the edited digital image are performed in connection with an image editing application of the computing device that includes the patch matcher.

11. A method as described in claim 10, further comprising receiving the image editing application with the patch matcher from a service provider.

12. A system comprising:
  a patch matcher to output edited digital images based on digital images received as input and an image editing operation for which an offset prediction neural network of the patch matcher is trained to generate offset predictions formed as displacement maps;
  at least one processor; and
  memory having stored thereon computer-readable instructions that are executable by the at least one processor to perform operations comprising:
    exposing a digital image to the patch matcher; and
    receiving an edited digital image from the patch matcher, the edited digital image generated by setting pixel values for image pixels of the exposed digital image that are affected by the image editing operation, the pixel values of the affected image pixels set according to an offset prediction formed as a displacement map generated by the offset prediction neural network, the displacement map including offset vectors that indicate a displacement of image pixels of the exposed digital image to different locations for performing the image editing operation.

13. A system as described in claim 12, wherein the patch matcher includes at least a first and a second offset prediction neural network trained to generate the offset predictions formed as the displacement maps for at least a first and a second image editing operation, respectively.

14. A system as described in claim 12, wherein at least one of:
  the offset prediction neural network is configured as a convolutional neural network having four intermediate dilated convolution layers;
  the offset prediction neural network is configured as a feed-forward neural network;
  the offset prediction neural network is trained using a differentiable sampling technique to sample the offset vectors of the offset predictions generated by the offset prediction neural network during training; or
  the offset prediction neural network is trained without generative adversarial training.

15. A method comprising:
  exposing a digital image to a patch matcher that outputs edited digital images based on digital images received as input and an image editing operation for which an offset prediction neural network of the patch matcher is trained to generate offset predictions formed as displacement maps; and receiving an edited digital image from the patch matcher, the edited digital image generated by setting pixel values for image pixels of the exposed digital image that are affected by the image editing operation, the pixel values of the affected image pixels set according to an offset prediction formed as a displacement map generated by the offset prediction neural network, the displacement map including offset vectors that indicate a displacement of image pixels of the exposed digital image to different locations for performing the image editing operation.

16. A method as described in claim 15, further comprising:
receiving a holey digital image having at least one hole comprising a group of contiguous image pixels with values indicating an absence of depicted imagery;
exposing the holey digital image to the patch matcher; and
receiving a filled digital image as output from the patch matcher, the filled digital image including hole-filling digital content in place of the at least one hole.

17. A method as described in claim 16, wherein the holey digital image has multiple holes.

18. A method as described in claim 15, wherein exposing the digital image and receiving the edited digital image are performed in connection with an image editing application that includes the patch matcher.

19. A method as described in claim 15, wherein the patch matcher includes at least a first and a second offset prediction neural network trained to generate the offset predictions formed as the displacement maps for at least a first and a second image editing operation, respectively.

20. A method as described in claim 15, wherein the image editing operation comprises at least one of:
a hole-filling operation;
an image retargeting operation;
an optical flow prediction operation; or
a future video-frame prediction operation.

* * * * *